UNITED STATES PATENT OFFICE.

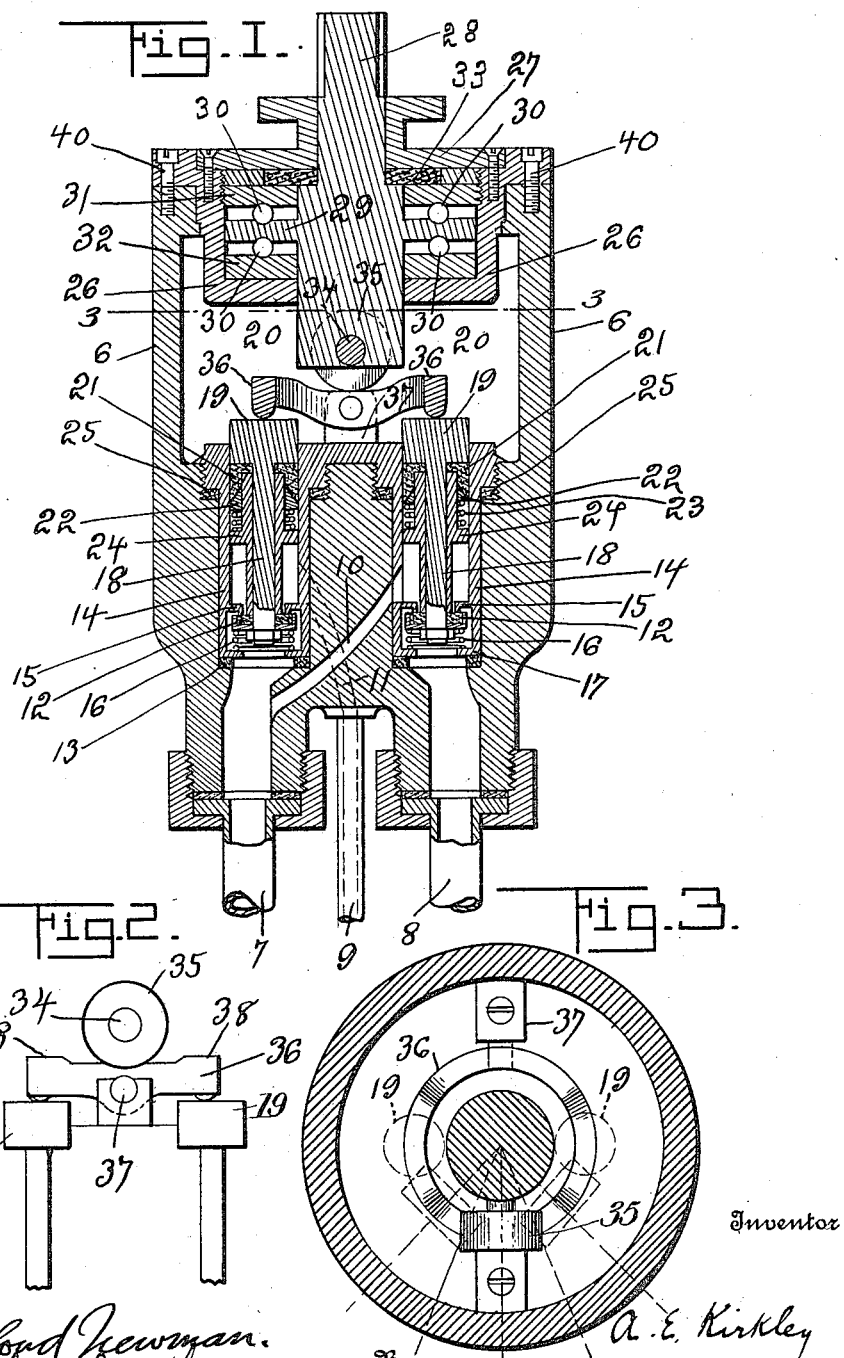

ARTHER E. KIRKLEY, OF NORTH AUGUSTA, SOUTH CAROLINA.

BRAKE-VALVE.

1,075,357.

Specification of Letters Patent.  Patented Oct. 14, 1913.

Application filed April 25, 1913. Serial No. 763,619.

*To all whom it may concern:*

Be it known that I, ARTHER E. KIRKLEY, a citizen of the United States, residing at North Augusta, in the county of Aiken and State of South Carolina, have invented certain new and useful Improvements in Brake-Valves, of which the following is a specification.

This invention relates to brake valves used in fluid pressure brake systems, and has for its object to provide an improved engineer's or motorman's valve, the principal object being to provide a valve containing an oil chamber for lubricating the operating parts, so constructed that the oil will not be exposed to the air. Many existing valves of this type are subject to the defect that the oil is exposed to the flow of air and is consequently blown out of the valve when the valve is operated, causing waste of oil and defective lubrication. I provide reciprocating valves operated by a turning spindle which works in the oil chamber from which lubricant is supplied to the bearings and also to the valves proper, the oil being contained in a closed or tight compartment and not exposed to the flow of air.

The valve is illustrated in the accompanying drawings in which—

Figure 1 is a central longitudinal section of the valve. Fig. 2 is a detail in side elevation of the valves and operating rocker. Fig. 3 is a section on the line 3—3 of Fig. 1.

Referring specifically to the drawings, 6 indicates the valve body or casing having pipe connections at 7 to the train pipe, at 8 to the reservoir, and at 9 to the exhaust, these connections being preferably tapped into the lower end of the casing. A cored passage 10 communicates between the reservoir and train passage and a cored passage 11 between the train passage and the exhaust, and these passages are controlled by a pair of valves 12 and 13 of the reciprocating type. The valves are similarly constructed and a description of one will answer for both. Each works in a bushing 14 set in the casing at the head of the train and reservoir passages respectively, and this bushing 14 has a seat 15 against which the valve is normally held closed by a spring 16 thereunder, the spring being confined by a ring 17 in the lower end of the bushing. The valve disk is carried at the lower end of a stem 18 which has a head 19 projecting above the upper end of the bushing into an oil chamber 20 in the upper part of the casing. Each valve is packed by a leather thimble 21, a wedge collar 22 and a spring 23 pressing behind the collar, the stem 18 being inclosed in a sleeve 24. The bushing is screwed into a suitable bore in the casing, with a leather gasket 25 confined between shoulders on the bushing and casing to prevent leak, the ports 10 and 11 being cored in the casing and opening through the bushings, at their upper ends, above the valve seats.

The top of the oil chamber 20 is closed by a cap 26 recessed on the upper side to hold the bearings, and with a bonnet or gland 27 covering the recess. The operating stem or spindle 28, to which the usual handle will be applied, extends through the bonnet and the cap, into the oil chamber, and may be turned to operate the valves. The spindle has a circular projecting flange 29 extending around the same, and works on ball bearings 30 confined between the upper and lower sides of the flange and upper and lower race plates 31 and 32, all confined in the recess in the cap 26. A felt washer 33 is interposed between the bonnet, a shoulder on the valve spindle, and the upper bearing plate 31.

At its lower end, in the oil chamber 20, the spindle 28 has a laterally extending pin 34, carrying a roller 35 which is adapted to rock an annular rocker 26 pivoted on diametrically opposite trunnions 37 and extending at opposite sides over the valve heads 19. The rocker has raised or cam surfaces 38 at opposite sides, and when the spindle 28 has turned either to the right or to the left the roller 35 rides on these cam surfaces and depresses the corresponding side of the rocker and depresses and opens the valve on that side. To connect the reservoir and train pipes the valve 13 is pressed down and opened. To exhaust the train pipe the valve 12 is pressed down and opened, and when the operating spindle is in middle position both valves are closed by the air pressure below, and the springs 16. The cap can be removed by taking out the screws 40 by which it is held to the casing.

The chamber 20 is filled with oil, and it supplies lubricant to the valves as well as to the spindle and its bearings, the rocker, and the roller. This oil chamber is closed off from the air passages, so that oil is not blown out or entrained by the flow of air through the valves and passages, and therefore a supply of oil will last a long time, the chamber being practically fluid tight.

The illustrated details of the valves and other parts are not essential, and no limitation to the special structure illustrated is implied.

What I claim is:

1. A brake valve comprising a casing having a plurality of ports therein, and an oil chamber in said casing, a valve controlling each of said ports and having heads projecting into the chamber, a rocker in the chamber, adapted to bear on either of said heads to open the corresponding valve, and means extending into the chamber to oscillate the rocker.

2. A brake valve comprising a casing having ports in the lower part thereof and an oil chamber in the upper part, valves controlling said ports and projecting into said chamber, a recessed cap on the chamber, an operating spindle extending through the cap and into the chamber, bearings in the recess in the cap for the spindle, operating connections in said chamber, between the spindle and the valves, and a bonnet on the cap, inclosing the bearings.

3. A brake valve comprising a casing having a plurality of ports therein, a valve controlling each of said ports, a rocker mounted in the casing and adapted to bear against either of said valves to operate the same, an operating spindle extending into the casing, and a projecting member carried by the spindle and adapted to bear upon the rocker to oscillate the same.

4. A brake valve comprising a casing having a plurality of ports therein, a valve controlling each of said ports, an annular rocker mounted in the casing and adapted to bear against either of said valves to operate the same, said rocker having cam surfaces on opposite sides thereof, an operating spindle extending into the casing, and a roller carried by the inner end of the spindle and adapted to bear against either of said cam surfaces, to oscillate the rocker and open either valve.

In testimony whereof, I affix my signature in presence of two witnesses.

ARTHER E. KIRKLEY.

Witnesses:
 JOHN R. BATES,
 R. E. BROADWATER.